United States Patent [19]

Clostermeyer

[11] Patent Number: 5,450,704
[45] Date of Patent: Sep. 19, 1995

[54] CLOSED-THROAT ROTARY BALER

[75] Inventor: Gerhard Clostermeyer, Gütershloh, Germany

[73] Assignee: Claas oHG beschränkt haftende offene, Harsewinkel, Germany

[21] Appl. No.: 215,382

[22] Filed: Mar. 21, 1994

[30] Foreign Application Priority Data

Mar. 19, 1993 [DE] Germany .................. 43 08 646.2

[51] Int. Cl.⁶ ............................................. B65B 63/04
[52] U.S. Cl. ......................................... 53/118; 53/116; 53/587; 56/341
[58] Field of Search ............... 53/116, 118, 211, 587; 56/341; 100/5, 87, 88

[56] References Cited

U.S. PATENT DOCUMENTS

| | | | |
|---|---|---|---|
| 4,182,101 | 1/1980 | Gaeddert et al. | 56/341 |
| 4,393,764 | 7/1983 | Viaud | 56/341 X |
| 4,422,373 | 12/1983 | Gaeddert | 56/341 X |
| 4,444,098 | 4/1984 | Soteropulos | 56/341 X |
| 4,470,247 | 9/1984 | Mast . | |
| 4,633,659 | 1/1987 | Anstey et al. | 56/341 |
| 4,782,652 | 11/1988 | White | 56/341 |
| 4,956,968 | 9/1990 | Underhill | 53/587 X |
| 4,993,217 | 2/1991 | Pfrimmer et al. | 56/341 |
| 5,014,613 | 5/1991 | Merritt, III et al. . | |
| 5,097,760 | 3/1992 | Ratzlaff et al. | 56/341 X |
| 5,129,208 | 7/1992 | Van Zee | 53/587 X |
| 5,216,873 | 6/1993 | Ratzlaff et al. | 53/587 |

FOREIGN PATENT DOCUMENTS

| | | |
|---|---|---|
| 0088240 | 9/1983 | European Pat. Off. . |
| 0120544 | 10/1984 | European Pat. Off. . |
| 0150631 | 8/1985 | European Pat. Off. . |
| 0287704 | 10/1988 | European Pat. Off. . |
| 0341508 | 11/1989 | European Pat. Off. . |
| 0499064 | 8/1992 | European Pat. Off. . |
| 0584473 | 3/1994 | European Pat. Off. . |
| 2740292 | 3/1979 | Germany . |
| 3304518 | 8/1983 | Germany . |
| 4025947 | 2/1992 | Germany . |
| 4102034 | 7/1992 | Germany . |
| 4104643 | 8/1992 | Germany . |
| 9211541 | 12/1992 | Germany . |
| 1192711 | 11/1985 | U.S.S.R. . |
| 1498428 | 8/1989 | U.S.S.R. . |
| 9209191 | 6/1992 | WIPO . |

Primary Examiner—Lowell A. Larson
Assistant Examiner—Daniel Moon
Attorney, Agent, or Firm—Browdy and Neimark

[57] ABSTRACT

The shaping machine for circular bales of crop material has straps (belts) (12) continuously passing around a plurality of rollers (2 to 11) in a movable housing (1, 1a) which can be tilted open, forming and defining a coiling chamber (13) and having a crop material inlet (14) for the retrieved and conveyed crop material (15) between two lower rollers (2, 3) disposed at a distance from each other. A rotor (17) is disposed in the crop material inlet (14), which conveys the crop material (15) into the coiling chamber (13) while compressing the crop material, and closes off the inlet (14) at the bottom.

18 Claims, 3 Drawing Sheets

CLOSED-THROAT ROTARY BALER

BACKGROUND OF THE INVENTION

1. Technical Field

The invention relates to a shaping machine for circular bales of crop material (circular bale press) with straps (belts) continuously passing around a plurality of rollers in a movable housing which can be tilted open, forming and defining a coiling chamber and having a crop material inlet for the retrieved and conveyed crop material between two lower rollers disposed at a distance from each other.

2. Prior Art

Such circular bale presses have become known in various embodiments, for example from German Patent DE-PS 28 51 035 and European Patent Publication EP 0 076 502, wherein the crop material picked up from the ground is placed in an almost vertical direction into the crop material inlet of the coiling chamber.

The disadvantage of this is that the initial coiling chamber is filled to the top, in particular with short crop material, and no coiling start occurs. In such a case the coiling chamber must be emptied.

A further disadvantage lies in that because of the running direction of the belt crop material is moved out of the inlet in the direction of travel and subsequently malfunctions are created in the following binding area.

OBJECT AND SUMMARY OF THE INVENTION

It is the object of the invention to improve a shaping machine for circular bales of crop material designed in the manner mentioned above in such a way that the crop material can be supplied to the crop material inlet along a short conveying path, that in the course of this the bale core assuredly begins turning, that the coiling chamber, which is continuously being enlarged by the bale being formed is advantageously closed off at the inlet, and that the belts turn in a way which is advantageous for optimum bale pressing.

The shaping machine for circular bales of crop material of the invention is a combination of continuously revolving straps (belts) and a rotor assigned to the crop material inlet which cooperates with strippers and can selectively cooperate with fixed cutters.

In an advantageous manner this rotor is vertically disposed below and in the crop material inlet, it conveys and, if required, comminutes the conveyed crop material in the desired way and introduces it along a short path directly into the coiling chamber.

The rotor represents the lower limit of the coiling chamber, brings the crop material directly into the coiling chamber and, in the initial phase, actively assists the rotation of the bale.

During the beginning of bale formation (see FIG. 1), the bale is supported by the rotor by means of strippers, because the rotor limits the crop material input at the bottom.

A trouble-free entry of the crop material into the coiling chamber is assured by the forced conveyance and the selective embodiment of the rotor as a cutter mechanism for comminuting the crop material, blockages or the like are prevented and the crop material in the subsequently prepared circular bale has the desired comminuted size.

The turning direction of the straps, the rotor and the rollers located in the crop material inlet has been selected to be such that, on the one hand, the bale core is perfectly formed and that, on the other hand, crop material cannot be moved out again, since the movement direction and conveying direction of the cooperating elements have been matched to each other.

The rotational speeds of the rotor (cutting mechanism) and the straps are the same but, depending on the type of crop material, differ from each other in that the rotor can turn faster to retain his packing effect.

During coiling of the bale, the rotor still extends into the bale with its prongs and assists the rotary movement and core forming of the bale.

As the size of the bale increases, it is supported more and more on the cylinders (rollers) on the inlet side.

BRIEF DESCRIPTION OF THE DRAWINGS

An exemplary embodiment of the invention is illustrated in the drawings and will be explained below. Shown are in.

DETAILED DESCRIPTION OF THE PREFERRED EMBODIMENT(S) OF THE INVENTION

Figure 1:
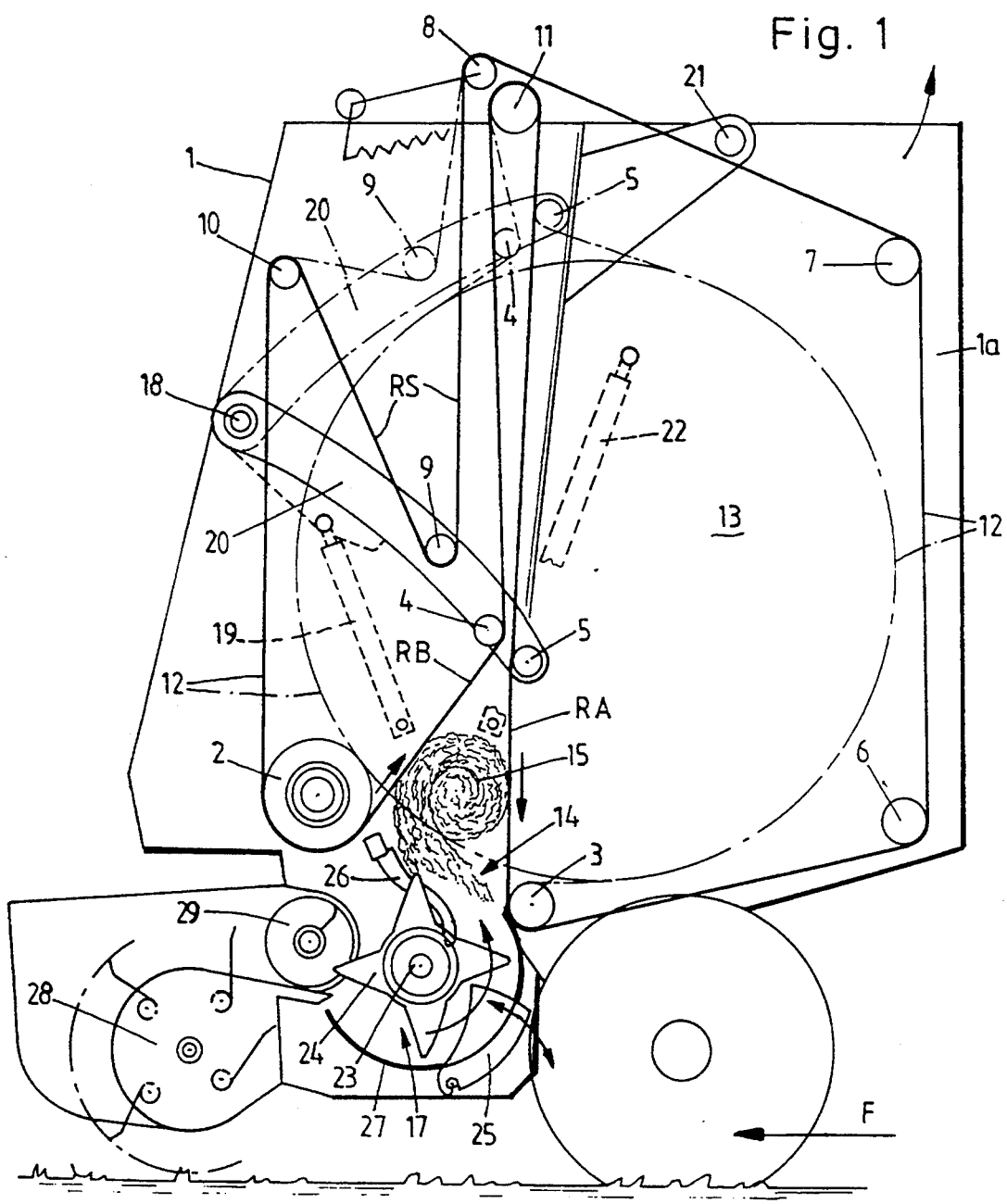
FIG. 1, a schematic lateral view of a machine for forming (pressing) cylindrical circular bales in the initial (start) position of the continuously turning straps which form the coiling chamber together with rollers, FIG. 2, a schematic lateral view of the same machine with a rotor disposed in the crop material inlet of the coiling chamber and with a net and twine station disposed on the outside, FIG. 3, a schematic lateral view of the same machine with a roller additionally assigned to the crop material inlet and with a net and twine inlet station.

The shaping machine for circular bales of crop material (circular bale press) has straps (belts) (12) continuously passing around a plurality of rollers 2 to 11) in a movable housing (1) which can be tilted open, forming and defining the essential part of a coiling chamber (13) and has, between two lower rollers (2, 3) disposed at a distance from each other, a crop material inlet (14) for the retrieved and conveyed crop material (15) which is to be wound (pressed) into a circular bale (16).

A rotor (17), which conveys the crop material (15) through the inlet (14) into the coiling chamber (13) and limits (closes off) the inlet (14) and thus the coiling chamber (13) at the bottom, is disposed at least approximately vertically under the crop material inlet (14), preferably in the crop material inlet (14), wherein this rotor (17) partially extends into the inlet (14) and closes off the inlet (14) with its rotating periphery.

Figure 3:
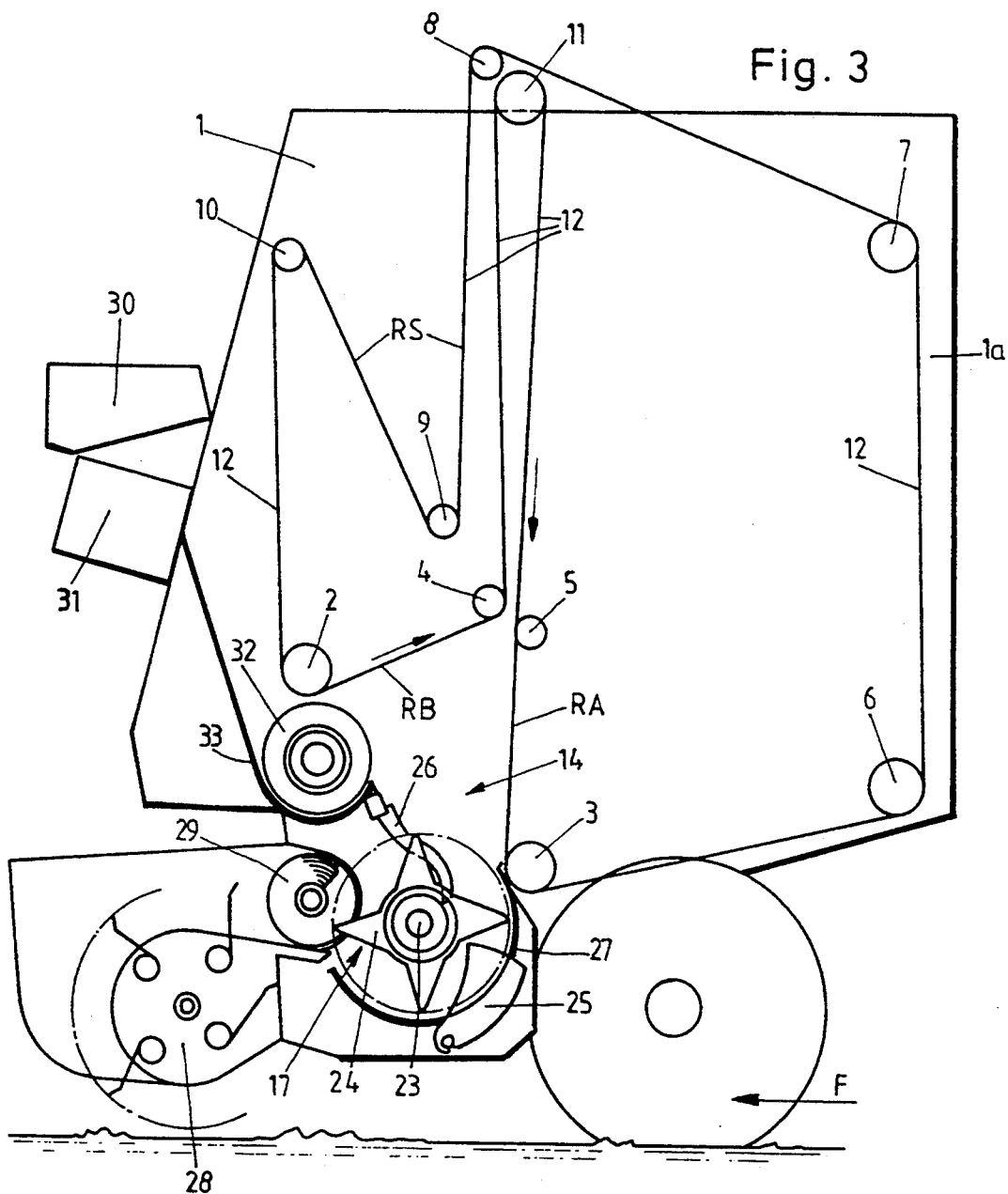

The initial coiling chamber (13) is embodied in the initial position (starting position in FIGS. 1 and 3) by two strap sections (RA, RB) tapering upward in the shape of a funnel, and in the process the strap section (RA) which, in the movement direction (F) of the machine is in the rear, is moved almost vertically downward, and the strap section (RB) which is in the front in the movement direction (F) is moved obliquely upward and in the direction toward the rear strap section (RA) (see directional arrows in FIGS. 1 and 3).

The funnel end located on the top of the coiling chamber (13) adjoining the crop material inlet (14) is defined by the two rollers (4, 5) which are rotatably seated on a control lever (20) which can be pivoted in height around a horizontal shaft (18) as a function of the bale formation and the pivot movement of which is braked (held back) by a pressure medium cylinder (19).

The rollers (6, 7, 8, 10 and 11) are fixedly but rotatably seated in the housing (1), and the roller (9) is disposed on the control lever (20), can also be pivoted in height along with it and forms a strap buffering and tensioning section (RS) between the rollers (8 and 10), which permits the formation of the coiling chamber (13) by changes in length.

The rollers (3, 6, 7) are seated on the housing part (1a), which can be tilted open around a horizontal shaft (21) by means of the pressure medium cylinder (22) for ejecting the finished bale (16).

The motor-driven rotatable rotor (17) is constituted by a pronged rotor (24), which is rotatable around a horizontal shaft (23) and to which cutters (25) and strippers (26), which can be switched on and off, can be assigned so that it forms a cutter mechanism. The pronged rotor (24) turns in accordance with the directional arrow in FIG. 1 opposite the direction of the two counter-rotating strap sections (RA, RB).

A conveying conduit (27) for the crop material (23) is disposed around the pronged rotor (24), into which the height-pivotable cutters (25), which cooperate with the prongs of the rotor (24), extend, i.e. they can be moved in and out of it.

The strippers (26) form a blocking grating between the pronged rotor (24) and the rollers (2, 32) and close off this space of the inlet (14) toward the bottom.

A pick-up (28) with lateral conveying worms (29) is placed ahead of the rotor (17) or the cutter mechanism (17) for picking up and conveying crop material.

The coiling chamber (13) can be formed from a set of a plurality of continuously rotating straps (12) disposed next to each other, i. e. the entire coiling chamber (13) is enclosed by an endless strap which is disposed in an adjoining manner, as shown in FIGS. 1 and 3.

Furthermore, the coiling chamber (13) can be formed of two sets of straps of respectively a plurality of continuously rotating straps (12) disposed next to each other, wherein one set of straps rotates in the fixed housing and the second set of straps in the tiltable housing part (1a) around the respective rollers (2 to 11).

A net and/or twine uncoiling and supply station (30, 31) is assigned to the outside of the coiling chamber (13), which has a net or twine inlet (33) which can be connected with the strap deflection roller (2) (FIG. 1) in front in the direction of travel (F), or with one or a plurality of separate roller(s) (32) (FIG. 3) underneath the strap deflection rollers (2), in the form of a trough-shaped guide plate of preferably a flexible material, which can be engaged with the roller (2 or 32) for the frictionally connected movement (transporting) of the net (30a) or the twine (31a) into the inlet (14) for binding the bale.

Figure 2:
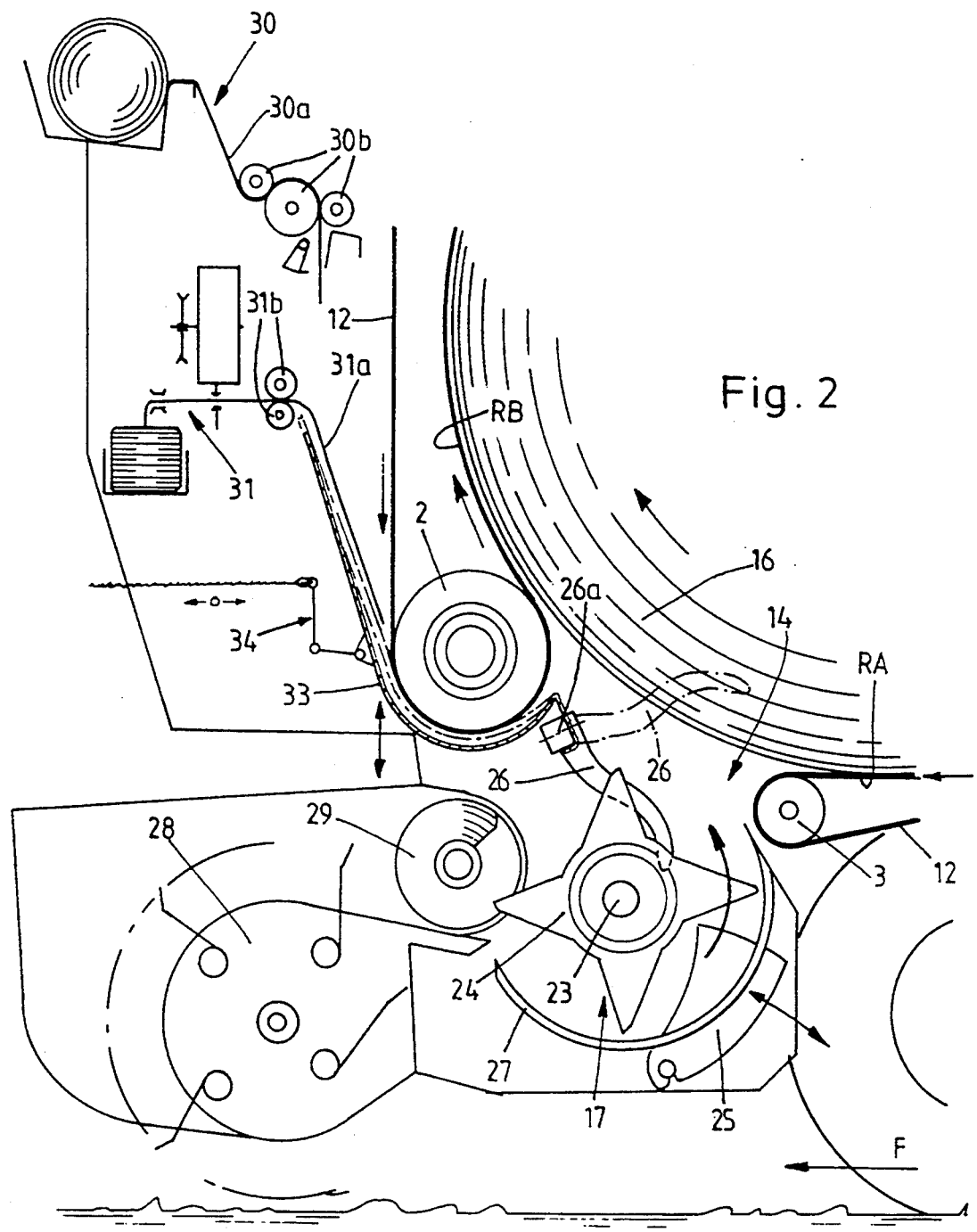

The trough-shaped inlet (33) which partially surrounds the roller (2, 32) is connected with a controllable pulling device (34) which pulls the inlet (33) into its operational position in the direction of the arrow in FIG. 2 against the roller (2, 32).

Controllable advancement rollers (30b, 31b) are respectively assigned to the net and twine station (30, 31).

The crop material fed to the rotor (17) or the crop material fed to the cutter mechanism (17) and comminuted by it is conveyed into the coiling chamber (13), where the crop material (15) is wound by means of the rotating straps (12) and made into a continuously growing circular bale (16).

In the process the straps (12) form a continuously enlarging coiling chamber (13), because the strap sections (RA, RB) diverge, the rollers (4, 5, 9), together with the control lever (20), move upward into the position shown by dash-dotted lines in FIG. 1, and the strap area between the two rollers (3, 5) is placed around the bale (16) in the area of the tiltable housing part (1a), as shown in FIG. 1 by the dash-dotted strap path, so that the straps are wound circularly around the bale (16) from the direction of both sides of the fixed rollers (2, 3).

The feeding of crop material is interrupted after the bale (16) is finished and the bale is wrapped in the net (30a) or with twine (31a) while the straps 12 continue to run. In the process the advancement rollers (30b or 31b) transport the net (30a) or the twine (31a) to the inlet (33) which is pulled against the roller (2, 32) by means of its pulling device (34) when the net (30a) or the twine (31a) have arrived and in this way causes the transport of the net or twine. As soon as the net (30a) or the twine (31a) are taken along by the bale (16) itself, the advancement rollers (30b, 31b) are disconnected and are free-wheeling to stop the net or twine transport, and the inlet (33) is also pulled away from the roller (2, 32), so that then the rotating bale (16) itself pulls the net (30a) or twine (31a) out of the stations (30, 31) to finish the wrapping process.

After severing the wrapping material (30a, 31a), the housing part (1a) is tilted upward and the bale (16) is ejected from the housing (1), in the course of which the upward-running strap section (RB) aids the bale ejection.

To prevent damage of the finished bale (16) by the rotor prongs during the ejection of the bale, support elements which support the finished bale (16) are inserted prior to the ejection of the bale into the coiling chamber (13) between the rollers (3, 2/32) at the inlet side. To provide support elements, it is possible to a. pivot the strippers (26) entirely or partially upward around their hinge axis (26a) on the housing (1),
b. insert an additional support grating between the strippers (26),
c. assign upwardly pivotable rollers or support panels to the rollers (3), which are preferably disposed underneath the rollers (3) and act against the bale (16) as a function of the housing part (1a) which can be tilted upward.

In addition, prior to the bale ejection, the rotor (17) can be turned off or pivoted or displaced toward the front or downward.

I claim:

1. A shaping machine for circular bales of crop material comprising:
    a movable housing which can be tilted open;
    a plurality of rollers within the housing including a first lower roller and a second lower roller;
    at least one strap continuously passing around the rollers, the strap forming and defining a coiling chamber, the coiling chamber being generally closed by the strap and the housing except for a crop material inlet for accepting into the coiling chamber retrieved and conveyed crop material,
    the crop material inlet being disposed between the first lower roller and the second lower roller; and
    a rotor disposed substantially between the first lower roller and the second lower roller in the crop material inlet to close off the crop material inlet, the rotor being rotatably seated substantially vertically under the crop material inlet, the rotor having a rotating periphery and acting to compact the crop material while conveying the crop material into the coiling chamber;

the rotor including prongs extending, to the rotating periphery, a constant diameter from a horizontal shaft defining an axis of rotation of the rotor; and strippers forming a blocking grating, the grating having slots through which the prongs protrude during a segment of rotor rotation.

2. The shaping machine according to claim 1, wherein the grating closes off the crop material inlet adjacent the first lower roller and the prongs close off the crop material inlet adjacent the second lower roller.

3. The shaping machine according to claim 2, further comprising a conveying conduit disposed adjacent the rotating periphery and having a conduit end disposed proximal the second lower roller.

4. The shaping machine according to claim 3,
wherein the prongs include cutters and the grating and the cutters together further comprise a cutter mechanism able to cut the crop material, and wherein the cutters and strippers can be turned on and off, the cutters and strippers are assigned, and during an initial phase of bale coiling the rotor rotates in the direction opposite to two counter-rotating strap sections.

5. The shaping machine according to claim 1, wherein the grating and the prongs together further comprise a cutter mechanism able to cut the crop material, whereby jamming of the shaping machine is avoided.

6. The shaping machine according to claim 1, wherein the rotor and the grating support the crop material within the coiling chamber during an initial phase of bale coiling.

7. The shaping machine in accordance with claim 1, wherein the coiling chamber is in an unfilled starting position bordered by a front strap section disposed toward a forward end of the shaping machine and a rear strap section disposed toward a rear end of the shaping machine, the front strap section and the rear strap section together defining an upwardly tapering funnel shape, the rear strap section running almost vertically downward and the front strap section having a lower part running obliquely upward toward the rear strap section and an upper part running generally parallel to the rear strap section, the front strap section and the rear strap section moving counter-rotatingly adjacent the coiling chamber.

8. The shaping machine in accordance with claim 1, wherein the strap includes a plurality of continuously rotating straps disposed next to each other.

9. The shaping machine in accordance with claim 8, wherein the coiling chamber is formed by the plurality of straps.

10. The shaping machine in accordance with claim 1, wherein the strap includes a first plurality of continuously rotating straps disposed next to each other and a second plurality of continuously rotating straps disposed next to each other.

11. The shaping machine in accordance with claim 1, including binding means for disposing binding material about a bale within the shaping machine, the binding material including selectively net and twine, the binding means further comprising:

an uncoiling and supply station disposed outside of the coiling chamber;

a binding material inlet including a guide plate, the guide plate being of a flexible material and trough-shaped, the guide plate able to be connected with selectively the first lower roller to delimit the crop material inlet and at least one separate roller, the separate roller being disposed underneath the first lower roller and able to be moved toward or away from the first lower roller.

12. The shaping machine in accordance with claim 11, wherein the binding means further includes a pulling device to control movement of the guide plate;

wherein the uncoiling and supply station includes controllable advancement rollers for net and twine transport, the advancement rollers able to be briefly moved into operational contact with the binding material to permit pulling of the binding material by the rotating bale.

13. The shaping machine in accordance with claim 1, including support elements for ejecting a bale and means for moving the support elements into the coiling chamber between crop material inlet rollers at the inlet side and protect the finished bale against damage by the rotor.

14. The shaping machine in accordance with claim 13, wherein the support elements comprise the strippers and the strippers include means for pivoting through a selected angle about a stripper hinge axis.

15. The shaping machine in accordance with claim 14, wherein the support elements comprise an additional support grating adapted to be moved in between the strippers.

16. The shaping machine in accordance with claim 13, wherein the support elements comprise upwardly pivotable support panels are assigned to the rollers and being preferably disposed underneath the second lower roller and acting against a bale upon motion of an upwardly tiltable housing part.

17. The shaping machine in accordance with claim 1, wherein for bale ejection rotation of the rotor is stopped.

18. The shaping machine in accordance with claim 1, wherein for bale ejection rotation of the rotor is pivoted or displaced toward the front of the shaping machine or downward.

* * * * *

UNITED STATES PATENT AND TRADEMARK OFFICE
CERTIFICATE OF CORRECTION

PATENT NO. : 5,450,704
DATED : September 19, 1995
INVENTOR(S) : G. CLOSTERMEYER

It is certified that error appears in the above-indentified patent and that said Letters Patent is hereby corrected as shown below:

Title page, Item [73] (assignee), after "offene" insert --Handelsgesellschaft--.

Signed and Sealed this

Twentieth Day of August, 1996

Attest:

BRUCE LEHMAN

Attesting Officer     Commissioner of Patents and Trademarks